United States Patent Office 3,336,353
Patented Aug. 15, 1967

3,336,353
NORTESTOSTERONES AND 15-OXYGENATED
B-NORTESTOSTERONES
Louis R. Fare, Willingboro, and Kenneth G. Holden, Stratford, N.J., and Joseph R. Valenta, Philadelphia, Pa., assignors to Smith Kline & French Laboratories, Philadelphia, Pa., a corporation of Pennsylvania
No Drawing. Filed Mar. 10, 1964, Ser. No. 350,672
5 Claims. (Cl. 260—456)

This invention relates to methods of preparing $\Delta^{14,15}$-B-norsteroids and to the steroids themselves. These $\Delta^{14,15}$-B-norsteroids have utility as therapeutic agents and as intermediates. For example the end products of this invention have utility as antiandrogenic agents especially those in 17α-methyl-B-nortestosterone series and as central nervous system depressants.

The compounds of this invention are prepared as follows.

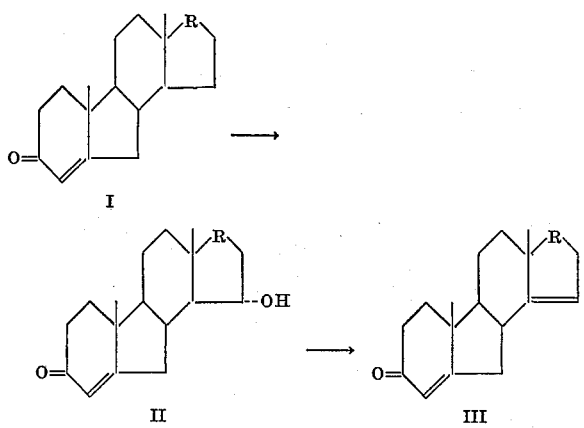

in which R represents

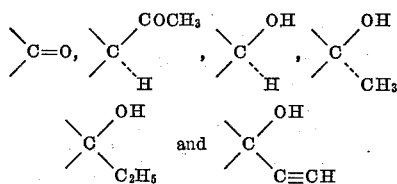

The starting materials for the process of this invention are all disclosed in U.S. Patent No. 3,072,681 or Joska, Coll. Czech. Chem. Com. 25, 1086 (1960). These basic B-norsteroids are oxygenated microbiologically by the whole cells of the oxygenating fungus *Aspergillus ochraceus* presumably by enzymatic action to form 15α-hydroxy derivatives. The *Aspergillus* fungus has been used previously in the art to introduce hydroxyl groups into the 11α-position of normal steroids by biotransformation (U.S. Patent No. 3,033,759 and U.S. Patent No. 2,802,775). Contrary to the art we have unexpectedly found that the same organism introduces the 15α-hydroxyl group into B-norsteroids in high yield. The conditions of the fermentation step are outlined in detail in the examples but have not been found to be a limiting factor.

The general conditions of the fermentation of this invention are as follows. The fermentation inocula are grown in 100 ml. of medium in 500 ml. Ehrlenmeyer flasks on a rotary shaker at 200 r.p.m. and ambient temperature, 200 ml. of inoculum is used per 10 liters of fermentation medium.

The media used are aqueous liquid media which provide assimilable sources of nitrogen and/or carbon. Additives variously used are corn steep liquor, peanut meal, fish meal, distillers dried solubles, coconut oil meal, Edamine, trypticase, soy broth, dextrose etc. The fermentations are carried out in 10 liter stir jars of New Brunswick Fermentation Units with a constant water bath temperature of 28–30° C. under aeration and agitation usually in the presence of an antifoam agent.

The substrate is dissolved in an organic solvent, not detrimental to the fermentation, such as ethanol then added beneath the surface of the medium usually after 24–48 hours growth of the selected organism. The production of the product is monitored to judge subsequent additions of substrate. The progress of the biotransformation of the steroid substrate during the fermentation is followed by thin layer chromatography on aliquots removed aseptically from the fermentation mixture. The aliquots are extracted with methyl isobutyl ketone or another water immiscible organic solvent. 5λ of the solvent extract is applied to silica gel-G plates. After development by a suitable solvent, the plates are dried and sprayed with a 40% sulfuric acid solution followed by heating with a hot air gun (min. temp. 500° C.). The developed spots are visible under white light or by fluorescence under ultraviolet light.

Following the fermentation the products are isolated by broth clarification, by centrifugation, or filtration followed by extraction of the solids then extraction of the solid extract and broth with a suitable water immiscible organic solvent such as methylene chloride. The extracted material is then purified by recrystallization or chromatography such as over an alumina or silica gel column.

Other organisms which can be alternatively used to 15-hydroxylate B-norsteroids are *Trichothecium roseum* ATCC 12543, *Aspergillus nidulans* ATCC 11267, *Beauveria densa*, *Fusarium chamydosporium* and a *Beauveria* sp.

The 15α-hydroxy-B-norsteroids of Formula II are important aspects of this invention as are their tosyl and other acyl derivatives. The tosyl derivatives are prepared by reacting the 15α-hydroxy-B-norsteroid with p-toluene sulfonyl chloride (tosyl chloride) in an excess of pyridine at room temperature usually overnight. Quenching separates the desired ester. Other esters can similarly be prepared especially those having acyl portions derived from carboxylic or sulfonic acids of a maximum of 10 carbon atoms. These are included in this invention.

The 15α-tosyloxy-B-norsteroid is decomposed or essentially dehydrated to form the desired $\Delta^{14,15}$-B-norsteroid of Formula III usually by reaction with a base such as with a combination of lithium chloride and lithium carbonate in a suitable solvent such as dimethylformamide or dimethylacetamide at reflux for several hours. The reaction mixture is worked up by procedures well known to the art and exemplified hereafter.

It will be recognized by those skilled in the art that the fermentation method of this invention is widely applied to B-norsteroids having a free methylene ring member at position 15. Substituents at other positions do not customarily block the course of this reaction and can be present as desired. In the testosterone series acyl derivatives at the 17-hydroxy can equivalently be used such as those derived from carboxylic acid of a maximum of 10 carbon atoms. The 17α-methyl-B-nortestosterone series is preferred in all aspects of our invention as described herein because the end product $\Delta^{14,15}$-17α-methyl-B-nortestosterone has pronounced antiandrogenic activity. These compounds also have central nervous system depressant activity especially sedative activity. The 15α-hydroxy-B-norsteroids of Formula III except 15α-hydroxy-B-nortestosterone itself are also oxidized using chromic acid in acetone to give the antiandrogenic 15-keto congeners.

The following examples are designed to illustrate this invention but are not meant to limit its scope.

Example 1

The fermentation medium is comprised of 20 g. of commercial enzymatic digest of lactalbumin (Edamine, Sheffield Co.), 50 g. of commercial dextrose (cerelose, Corn Products), 5 g. of corn steep liquors and water to make one liter. Ten liters of medium is prepared, adjusted to pH 6.3–6.5 with sodium hydroxide solution and autoclaved for 1½ hours at 15 p.s.i. at 121° C.

The fermentation reaction is carried out in 10 liter stir jars of New Brunswick Fermentation Units with a water bath temperature of 28–30° C. with aeration rate of 1 liter of air per minute per liter stirred at an impeller speed of 200 r.p.m. with a standard antifoam agent added.

The inoculum is prepared by using 100 ml. of the medium in 500 ml. Ehrlenmeyer flasks on a rotary shaker at 200 r.p.m., ambient temperature using *Aspergillus ochraceus* ATCC 12337. 200 ml. of inoculum is used per 10.1 fermentation.

A substrate solution of 17α-methyl-B-nortestosterone in 95% ethanol, 1 g. per 16 ml., is prepared. After 48 hours growth substrate solution containing 1 g. of substrate is pumped in below the surface of the liquid medium at 4 hour intervals until 10 g. of substrate is used. The formation of the product is periodically followed using thin layer chromatography with an ethyl acetate solvent system. The fermentation is terminated six hours after the last substrate addition.

The cells are removed by filtration through muslin then extracted with a 1:1 95% ethanol-methylene chloride mixture. After filtration the extracts are combined with the clarified broth which is then extracted with methylene chloride. The dried organic extracts are evaporated to dryness in vacuo at 50° C.

Crystallization of the residue from methylene chloride-methanol gives 57% of 15α-hydroxy-17α-methyl-B-nortestosterone, M.P. 243–249° C. Recrystallization from acetone of the residue from the mother liquors gives a minor amount of 11α-hydroxy-17α-methyl-B-nortestosterone, M.P. 190–191° C.

Example 2

A solution of 8.22 g. of 15α-hydroxy-17α-methyl-B-nortestosterone in 70 ml. of pyridine is mixed with 6.76 g. of p-toluene sulfonyl chloride. After standing at room temperature for 18 hours, the mixture is poured into 500 ml. of ice water. The precipitate which forms is collected by filtration to give, after recrystallization from acetone-hexane, 15α-tosyloxy-17α-methyl-B-nortestosterone, M.P. 90–93° C.

Other similar acylate derivatives such as acetate, propionate or benzoate are prepared by substituting equivalent quantities of the appropriate acyl halides or anhydrides in this procedure.

Example 3

A mixture of 5 g. of 15α-tosyloxy-17α-methyl-B-nortestosterone, 1.5 g. of anhydrous lithium chloride, 1.5 g. of lithiumcarbonate and 50 ml. of N,N-dimethylformamide is heated at reflux under a nitrogen atmosphere for 3 hours. The mixture is poured into water. Extraction with benzene gives, after recrystallization from acetone-hexane, $\Delta^{14,15}$-17α-methyl-B-nortestosterone, M.P. 160–168° C.

Example 4

Substituting B-norprogesterone in the fermentation reaction of Example 1, acylation reaction of Example 2 and dehydration reaction of Example 3 gives respectively 15α-hydroxy-B-norprogesterone, its tosylate and finally $\Delta^{14,15}$ - B-norprogesterone. Substituting B-nortestosterone gives 15α-hydroxy-B-nortestosterone, its bis tosylate and $\Delta^{14,15}$-B-nortestosterone after hydrolysis.

Substituting 17α-ethyl-B-nortestosterone or 17α-ethynyl-B-nortestosterone also gives the 15α-hydroxy, tosylate and $\Delta^{14,15}$ congeners in each respective series.

What is claimed is:
1. A compound of the formula:

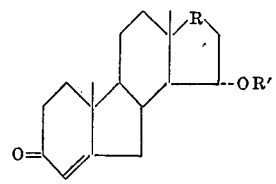

in which R is a member selected from the group consisting of

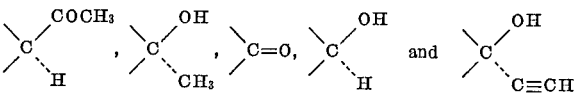

and R' is a member selected from the group consisting of hydrogen, tosyl, benzoyl and lower alkanoyl of up to 4 carbon atoms.

2. 15α-hydroxy-17α-methyl-B-nortestosterone.
3. 15α-tosyloxy-17α-methyl-B-nortestosterone.
4. A compound of the formula:

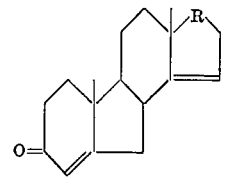

in which R is a member selected from the group consisting of

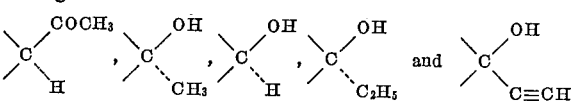

5. $\Delta^{14,15}$-17α-methyl-B-nortestosterone.

References Cited

UNITED STATES PATENTS
2,950,289  8/1960  Weisenborn _____ 260—456 X

FOREIGN PATENTS
774,064  5/1957  Great Britain.

CHARLES B. PARKER, *Primary Examiner*.

FLOYD D. HIGEL, *Assistant Examiner*.